2,989,516
POLYMERIZATION OF OLEFINS
Abraham Schneider, Overbrook Hills, Pa., assignor to Sun Oil Company, Philadelphia, Pa., a corporation of New Jersey
No Drawing. Filed Jan. 23, 1957, Ser. No. 635,596
8 Claims. (Cl. 260—88.2)

This invention relates to a process for the polymerization of olefins using a titanium chloride catalyst in which the catalyst is regenerated.

The polymerization of alpha-olefins such as ethylene and propylene to high molecular weight solid products by contacting, in an inert, liquid medium, the olefin with a chloride of titanium and an activator such as an aluminum trialkyl has been described. Such processes are performed as batch operations in which, after polymerization, the catalyst is deactivated and removed from the polymer by dissolution of the residual titanium compounds in water, alcohol, or aqueous or alcoholic solutions of inorganic acids. The process is unsatisfactory in that catalyst deactivation and removal are incomplete so that catalyst components, or deactivated residues thereof, remain in the polymer and deleteriously affect its properties, and the catalyst is not regenerated in the process. No convenient means for catalyst recovery and reuse has been employed.

An object of the present invention is to provide a process for the polymerization of olefins using a titanium chloride catalyst which provides for the regeneration of the titanium chloride and its reuse in the polymerization process. Another object is to provide a continuous process for the polymerization of olefins in which polymer products substantially free from catalyst are obtained and in which deactivated catalyst is reactivated and reused in the process. Other objects will be apparent hereinafter.

It has now been found that titanium trichloride deposited on a solid carrier, used with an activator therefor, is an excelelnt catalyst for polymerizing olefins, and that after catalyst deactivation by adherence thereto of polymer products, the catalyst can be regenerated and reused in the process. Regeneration can be accomplished by burning substantially all of the polymer from the catalytic composition while simultaneously converting the titanium subchloride to titanium dioxide. The resulting composition, consisting essentially of titanium dioxide deposited on the carrier, is thereafter reimpregnated with a titanium compound, preferably titanium tetrachloride, which is then reduced to the trichloride. It has been further found that the burning of the polymer from the catalyst can be performed in a controlled manner to leave residual carbon on the carrier. The resulting composition, which consists essentially of titanium dioxide and carbon deposited on the carrier, is then contacted with chlorine. The titanium dioxide is converted to titanium tetrachloride and carbon dioxide is evolved. The so-formed titanium tetrachloride is used to reimpregnate the same carrier, or a different carrier, and the impregnated composition is then subjected to reducing conditions to convert the tetrachloride to the trichloride. The resulting composition, together with an activator, is then used, or reused, in the polymerization process.

Olefins which can be polymerized in the process of the invention are the alpha-olefins, i.e., hydrocarbons which have a terminal olefinic linkage. It is preferred to use the normally gaseous olefins, ethylene, propylene, or mixtures of ethylene and propylene, but other alpha-olefins such as butene-1, isobutylene, and the pentenes, hexenes, heptenes and octenes which have a terminal olefinic linkage give good results. Mixtures of such olefins can be used and copolymers are thereby prepared.

The catalyst used in the process of the invention comprises a lower chloride of titanium deposited on a solid carrier, and an activator therefor. Titanium trichloride, titanium dichloride and mixtures thereof deposited on a carrier can be used. Solid carrier materials which give good results include, for example, alumina, kieselguhr, synthetic silica-alumina composites, calcined clays, and the like. The catalyst is prepared by impregnating a suitable carrier material with titanium tetrachloride and then reducing the tetrachloride to a subchloride so that a lower chloride of titanium deposited on the carrier is obtained. Impregnation of the carrier with the tetrachloride can be accomplished by any convenient means, such as by contacting the carrier with vapors of titanium tetrachloride, or by contacting the carrier with a solution of titanium tetrachloride in a saturated hydrocarbon. After such impregnation, the impregnated composition is subjected to reducing conditions to convert the tetrachloride to a lower chloride of titanium. Preferably a slurry of the impregnated carrier in a saturated hydrocarbon is contacted with a dispersion of an alkali or alkaline earth metal also in a saturated hydrocarbon medium. The reduction can also conveniently be accomplished by dissolving an organo-metallic compound, such as aluminum trialkyl, in the hydrocarbon medium containing the catalyst dispersion.

An activator is essential to the polymerization process of the invention. Where the reduction of the titanium tetrachloride is performed with an organo-metallic compound, such organo-metallic compound also serves as the activator. Where a material such as an alkali metal is employed for the reduction, an activator must be included in the reaction mixture. Aluminum trialkyls are preferred activators to employ. Materials which can be used as the activator, in addition to aluminum trialkyls, include other metal alkyls, metal hydrides, metal borohydrides, and alkyl metal halides. Suitable metal alkyls include alkyl derivatives of aluminum, zinc, beryllium, chromium, magnesium, lithium and lead. Aluminum triethyl, aluminum triisopropyl, aluminum triisobutyl, and the magnesium and zinc analogues thereof give good results in the process and are preferred, but metal alkyls having up to about 12 carbon atoms in the alkyl groups can be present and give good results. Alkali metal alkyls such as n-butyl-lithium, methylsodium, butylsodium, phenylisopropylpotassium, and the like, also illustrate metal alkyls that give good results in the process. Metal hydrides which can be used as polymerization activators include, for example, lithium hydride, lithium aluminum hydride and sodium hydride. Metal borohydrides such as sodium borohydride and potassium borohydride illustrate the borohydrides which can be used. Alkyl metal halides which can be used are Grignard reagents such as methylmagnesium bromide, ethylmagnesium chloride, phenylmagnesium bromide and the like.

The polymerization process of the invention can be performed as a fixed bed, moving bed or a slurry type of operation. An inert, liquid reaction medium is always employed, and the olefin dissolved in the liquid medium is contacted with the catalyst. Saturated hydrocarbons which are liquid under the polymerization conditions used are preferably employed. Pentanes, hexanes, octanes, decanes, methylcyclopentane, methylcyclohexane, decahydronaphthalene, and homologues and mixtures thereof illustrate saturated hydrocarbons which are preferably used as the inert, liquid medium. Polymerization conditions, including a temperature of from about 0° C. to 250° C. are employed. Atmospheric pressure gives good results, but higher pressures such as from 50 p.s.i.g. to 1000 (pounds per square inch gauge) or more accelerate the polymerization reaction by providing a higher concentration of the olefin in the reaction medium. A time sufficient for the desired degree of polymerization to occur should be employed. With fixed bed operation, a space rate of liquid reaction medium can vary from about 1 to 10 v./v./hr. (volume of liquid per volume of catalyst per hour), the medium containing at least 3% of dissolved olefin, and preferably containing from 5% to 25% dissolved olefin.

In fixed bed operation, the catalyst prepared as above described is separated from the medium in which reduction was performed, such as by settling, filtering, centrifuging, or the like, and is introduced into a reactor to form a bed, or, if desired, the catalyst can be prepared in situ. The particle size of the carrier should be selected to be of a size suitable for fixed bed operation. An olefin dissolved in a liquid, saturated hydrocarbon is then passed through the reactor under polymerizing conditions in contact with the catalyst. An activator, unless already incorporated with the catalyst, can be introduced together with the olefin as a solution in the inert hydrocarbon. Polymer dissolved in the hydrocarbon reaction medium is recovered from the reactor effluent. After operation has continued until polymer adhered to the catalyst particles has caused deactivation thereof and/or has plugged the reactor, the reaction is stopped. At least a portion of the contaminating polymer is preferably dissolved by passing a heated solvent through the catalyst bed. The heated solvent can be the same as or different from the reaction medium employed in the polymerization step. Such treatment may be sufficient to permit the polymerization to be continued, but the dissolution of the polymer is not complete so that repeated regeneration by this means is unsatisfactory. The reactor is then drained and polymer removed from the catalyst by burning in the presence of a controlled quantity of oxygen to prevent excessive heating. The presence of oxygen deactivates the titanium subchloride by conversion thereof to titanium dioxide. After the burning is substantially complete, the reactor is purged with an inert gas such as nitrogen and the catalyst bed impregnated with titanium tetrachloride vapors, or with titanium tetrachloride as a solution in an inert hydrocarbon. The tetrachloride is then reduced, as above described, and the polymerization step repeated.

In a preferred embodiment of the process of the invention, the burning of polymer from the catalyst is controlled so that a residual amount of carbon remains adhered to the catalyst particles. In the burning, the titanium subchloride compound is converted to titanium dioxide. Preferably the burning is controlled so that the quantity of residual carbon is at least equal to that of the titanium dioxide on a molar basis. Preferably a quantity of carbon of from 1 to 5 moles per mole of titanium dioxide remains. After the controlled burning, the reactor is purged with an inert gas such as nitrogen and chlorine passed through the catalyst bed. By this means, titanium dioxide is converted to titanium tetrachloride and carbon dioxide. The titanium tetrachloride vapors are separated by carbon monoxide by any convenient means, such as by condensing the tetrachloride vapors to liquid phase, and the tetrachloride used to reimpregnate the same carrier material. If desired, a different carrier material can be impregnated therewith. The impregnation can be as above described, and after impregnation, the tetrachloride is reduced to a lower chloride, also as above described. The resulting composition is then used in the polymerization process. If desired, the chlorination is advantageously performed at an elevated pressure so that evolved titanium tetrachloride remains in the reactor in contact with the solid carrier. On cooling the reactor, a major proportion of the tetrachloride redeposits on the carrier. Carbon monoxide is removed from the reactor, after cooling, such as by passing a stream of nitrogen through the reactor. The composition is then subjected to reducing conditions and is reused for the polymerization of alpha-olefins as above described. In this embodiment, the chlorination step is preferably performed at a temperature of about 700° C., say from about 600° C. to 800° C. The carrier material is preferably selected so that subjection thereof to temperatures within the stated range does not deleteriously affect its physical properties.

Although the process of polymerization in which the catalyst is regenerated in accordance with the invention is especially suitable for fixed bed operation, the method is also applicable to other types of operation, such as moving bed operation in which all or a portion of the catalyst from the polymerization step is subjected to regeneration as above described. In slurry-type operation, in which finely divided particles of the catalyst and an activator therefor are maintained as a dispersion in an inert medium and an olefin contacted therewith, the catalyst regeneration is performed by removing catalyst contaminated with relatively high boiling polymers from the dispersion such as by settling, centrifuging, or the like, and regeneration is then performed as above described.

The following specific embodiment illustrates the process of the invention in which "parts" refers to parts by weight unless otherwise indicated.

A synthetic silica-alumina composition containing about 87% alumina and 13% silica, and having a particle size of about 10 mesh (U.S. Series) is introduced into a reactor to form a solid bed. A vaporized mixture of titanium tetrachloride and nitrogen at a temperature of about 145° C. is passed through the catalyst bed until about 1 part of titanium tetrachloride per 100 parts of the silica-alumina particles is adsorbed. The reactor is then flushed with nitrogen and a solution containing 1 part of aluminum triethyl in 10 parts of isooctane passed through the bed. The quantity of solution passed through the bed is such that the mole ratio of aluminum triethyl supplied to titanium tetrachloride is about 10:1. The reactor is then flushed with isooctane and drained. A solution of propylene in decahydronaphthalene is then passed through the catalytic bed at a temperature of about 160° C. The quantity of propylene in the decahydronaphthalene is maintained at about 5% and the space rate, based on the liquid passing through the reactor, is 5 v./v./hr. Effluent from the reactor is cooled to about 20° C. to precipitate solid particles of polypropylene which appear as a white, finely divided precipitate. The polymer is filtered, washed with pentane and dried. The yield of polymer, based on the propylene consumed is about 92%. After operation for about 30 minutes, it is necessary to discontinue the operation because of plugging in the catalyst bed. Liquids are drained from the reactor and polymer burned therefrom by passing a mixture of oxygen and nitrogen through the reactor. Substantially all of the polymer is removed by this operation and the titanium compound is converted to titanium dioxide. The catalyst is regenerated by impregnating with titanium tetrachloride vapors followed by contacting with a solution of aluminum triethyl in isooctane as above described, and the polymerization operation continued with substantially equivalent results.

In another embodiment of the process of the invention operation is as above described, except that alumina is used as the carrier and, in burning polymer from the catalyst bed, a limited quantity of oxygen is employed. The burning is discontinued while carbon remains on the catalyst particles. After flushing the reactor with nitrogen, chlorine vapors at a temperature of about 700° C. are passed through the reactor for a time sufficient to convert at least a major proportion of the titanium dioxide to titanium tetrachloride, which is collected from the gaseous effluent by condensation. After discontinuing the chlorination, the reactor is flushed with nitrogen, cooled, and the recovered tetrachloride vaporized and contacted with the alumina in the reactor. A solution of aluminum triethyl is passed through the bed, as described in the above embodiment. On continuing the polymerization, substantially the same results are obtained as above described.

The solid polymer products prepared in accordance with the invention are useful for the preparation of containers for corrosive fluids, conduits for the transportation of liquids, films for packaging food materials, and the like. Such articles can be prepared by molding, extrusion, or other fabrication processes.

The invention claimed is:

1. Process for the polymerization of alpha-olefins which comprises contacting, in liquid phase under polymerizing conditions, an alpha-olefin with a solid catalytic composition comprising a subhalide of titanium extended on a solid carrier and an activator therefor, discontinuing such contacting when the activity of said composition is substantially decreased by adherence thereto of polymers of said olefin, contacting the composition of decreased activity with oxygen at an elevated temperature whereby polymer is burned therefrom, a portion of said polymer being converted to carbon which remains on the solid carrier, and said subhalide of titanium is converted to an oxide of titanium the carbon remaining on the catalyst being from 1 to 5 mols. per mol. of titanium oxide, contacting the resulting composition comprising said solid carrier, carbon, and an oxide of titanium with chlorine at an elevated temperature whereby titanium tetrachloride is evolved, and impregnating a solid carrier with the evolved titanium tetrachloride.

2. Process according to claim 1 wherein carrier is alumina.

3. Process according to claim 1 wherein carrier is a synthetic silica-alumina composite.

4. Process according to claim 1 wherein carrier is calcined clay.

5. Process according to claim 1 wherein the alpha-olefin is ethylene.

6. Process according to claim 1 wherein the alpha-olefin is propylene.

7. Process according to claim 1 wherein the alpha-olefin is a mixture of ethylene and propylene.

8. In a process for the polymerization of alpha-olefins wherein an alpha-olefin dissolved in a substantially inert, saturated hydrocarbon is contacted under polymerising conditions with a solid catalyst comprising titanium trichloride deposited on a solid carrier and an activator selected from the group consisting of metal alkyls, metal hydrides, metal borohydrides and alkyl metal halides, and said solid catalyst becomes deactivated by adherence thereto of polymers of said alpha-olefin, the improvement which comprises contacting the deactivated catalyst with oxygen at an elevated temperature whereby the adhered polymers are burned therefrom, a portion of said polymers being converted to carbon which remains on the solid carrier, and whereby said titanium trichloride is converted to titanium dioxide to form a solid composition comprising titanium dioxide and carbon deposited on said solid carrier the carbon remaining on the catalyst being from 1 to 5 mols. per mol. of titanium oxide, contacting the resulting composition with chlorine at an elevated temperature to convert the titanium dioxide to titanium tetrachloride, impregnating said solid carrier with the so-formed titanium tetrachloride, subjecting the impregnated composition to reducing conditions whereby the titanium tetrachloride is converted to titanium trichloride, and reusing the resulting composition for the polymerization of an alpha-olefin.

References Cited in the file of this patent
UNITED STATES PATENTS

| | | |
|---|---|---|
| 2,701,179 | McKinney | Feb. 1, 1955 |
| 2,721,189 | Anderson et al. | Oct. 18, 1955 |
| 2,731,452 | Field et al. | Jan. 17, 1956 |
| 2,834,768 | Friedlander | May 13, 1958 |
| 2,843,577 | Friedlander et al. | July 15, 1958 |
| 2,883,265 | Evans et al. | Apr. 21, 1959 |
| 2,909,512 | Bruce | Oct. 20, 1959 |

FOREIGN PATENTS

| | | |
|---|---|---|
| 530,617 | Belgium | Jan. 24, 1955 |
| 526,101 | Italy | May 14, 1955 |